(12) United States Patent
Xu

(10) Patent No.: US 10,820,190 B2
(45) Date of Patent: Oct. 27, 2020

(54) ESIM PROFILE SWITCHING WITHOUT SMS

(71) Applicant: iBasis, Inc., Lexington, MA (US)

(72) Inventor: Richard H. Xu, Wakefield, MA (US)

(73) Assignee: IBASIS, INC., Lexington, MA (US)

( * ) Notice: Subject to any disclaimer, the term of this patent is extended or adjusted under 35 U.S.C. 154(b) by 0 days.

(21) Appl. No.: 16/469,945

(22) PCT Filed: Mar. 27, 2018

(86) PCT No.: PCT/US2018/024576
§ 371 (c)(1),
(2) Date: Jun. 14, 2019

(87) PCT Pub. No.: WO2018/183332
PCT Pub. Date: Oct. 4, 2018

(65) Prior Publication Data
US 2020/0084614 A1 Mar. 12, 2020

Related U.S. Application Data

(60) Provisional application No. 62/479,093, filed on Mar. 30, 2017.

(51) Int. Cl.
*H04W 8/24* (2009.01)
*H04W 36/14* (2009.01)
(Continued)

(52) U.S. Cl.
CPC ............ *H04W 8/245* (2013.01); *H04W 8/24* (2013.01); *H04W 36/14* (2013.01); *H04W 64/00* (2013.01); *H04W 76/12* (2018.02)

(58) Field of Classification Search
CPC ..... H04W 8/245; H04W 76/12; H04W 36/14; H04W 64/00; H04W 8/24; H04W 36/24; H04W 60/04
See application file for complete search history.

(56) References Cited

U.S. PATENT DOCUMENTS 5,940,512 A 8/1999 Tomoike
6,085,084 A 7/2000 Christmas
(Continued)

FOREIGN PATENT DOCUMENTS

EP 2 530 884 A1 12/2012
EP 2 675 111 A1 12/2013
(Continued)

OTHER PUBLICATIONS

"Barriga et al., "M2M Remote-Subscription Management," Ericsson Review, 6 pages (2011)".

(Continued)

*Primary Examiner* — Magdi Elhag
(74) *Attorney, Agent, or Firm* — Hamilton, Brook, Smith & Reynolds, P.C.

(57) ABSTRACT

A system and method enabling eSIM profile switching without SMS channel support. According to at least one example embodiment, in system in which a device has an eSIM that includes a first profile and a second profile, the device switching from attachment to a first network using the first profile to attachment to a second network using the second profile, the second network connecting to a third network over a data tunnel, a method includes extracting, at a policy control device in the third network, information communicated over the data tunnel, the information associated with the eSIM and sending, to an application server, at least a portion of the extracted information. The extracted information includes location information associated with the eSIM. Sending the extracted information serves as a notification to the application server that the eSIM has switched to the second profile.

12 Claims, 6 Drawing Sheets

(51) Int. Cl.
*H04W 76/12* (2018.01)
*H04W 64/00* (2009.01)

(56) References Cited

U.S. PATENT DOCUMENTS

| | | | |
|---|---|---|---|
| 6,157,636 | A | 12/2000 | Voit et al. |
| 6,658,458 | B1 | 12/2003 | Gai |
| 6,735,190 | B1 | 5/2004 | Chuah |
| 6,788,647 | B1 | 9/2004 | Mohaban et al. |
| 6,810,250 | B2 | 10/2004 | Jo et al. |
| 6,839,340 | B1 | 1/2005 | Voit |
| 7,184,764 | B2 | 2/2007 | Raviv et al. |
| 7,738,465 | B2 | 6/2010 | Akahane et al. |
| 8,095,124 | B2 | 1/2012 | Balia |
| 8,478,238 | B2 | 7/2013 | Mohammed et al. |
| 8,537,695 | B2 | 9/2013 | Wiley et al. |
| 8,593,958 | B2 | 11/2013 | Zhang |
| 8,751,647 | B1 | 6/2014 | Yip et al. |
| 8,811,969 | B2 | 8/2014 | Shi et al. |
| 8,671,204 | B2 | 11/2014 | Srinivasan |
| 9,060,263 | B1 | 6/2015 | Carames et al. |
| 9,104,643 | B2 | 8/2015 | DeCusatis |
| 9,137,140 | B2 | 9/2015 | Tao |
| 9,179,316 | B2 | 11/2015 | Raleigh |
| 9,198,022 | B1 | 11/2015 | Draznin et al. |
| 9,198,074 | B2 | 11/2015 | Raleigh et al. |
| 9,247,424 | B2 | 1/2016 | Haggerty et al. |
| 9,288,750 | B2 | 3/2016 | Tuli et al. |
| 9,319,223 | B2 | 4/2016 | Nix |
| 9,374,700 | B2 | 6/2016 | Trapp |
| 9,451,098 | B2 | 9/2016 | Zhu et al. |
| 9,555,332 | B2 | 1/2017 | Emura |
| 9,629,018 | B2 | 4/2017 | Xu |
| 9,781,229 | B2 | 10/2017 | Srinivasan et al. |
| 10,045,260 | B2 * | 8/2018 | Li ............... H04W 76/18 |
| 10,070,288 | B2 * | 9/2018 | Yu ............... H04W 8/06 |
| 10,263,903 | B2 | 4/2019 | Xu |
| 10,524,116 | B2 | 12/2019 | Xu et al. |
| 2002/0068578 | A1 | 6/2002 | Agarwal et al. |
| 2002/0080819 | A1 | 6/2002 | Tsao |
| 2004/0162058 | A1 | 8/2004 | Mottes |
| 2005/0152275 | A1 | 7/2005 | Laurila et al. |
| 2006/0187942 | A1 | 8/2006 | Mizutani |
| 2008/0049621 | A1 | 2/2008 | McGuire |
| 2008/0125114 | A1 | 5/2008 | Dorenbosch |
| 2009/0116398 | A1 | 5/2009 | Shi et al. |
| 2010/0158009 | A1 | 6/2010 | Lee |
| 2010/0191846 | A1 | 7/2010 | Raleigh |
| 2010/0311402 | A1 | 12/2010 | Srinivasan et al. |
| 2011/0235595 | A1 | 9/2011 | Mehta et al. |
| 2011/0275344 | A1 | 11/2011 | Momtahan et al. |
| 2011/0310734 | A1 | 12/2011 | Mizukoshi |
| 2012/0034916 | A1 | 2/2012 | Hu et al. |
| 2012/0041965 | A1 | 2/2012 | Vasquez et al. |
| 2012/0108205 | A1 | 5/2012 | Schell et al. |
| 2012/0108206 | A1 | 5/2012 | Haggerty |
| 2012/0108295 | A1 | 5/2012 | Schell et al. |
| 2012/0198061 | A1 | 8/2012 | Stenfelt et al. |
| 2012/0275442 | A1 | 11/2012 | Malets et al. |
| 2012/0282924 | A1 | 11/2012 | Tagg et al. |
| 2013/0029637 | A1 | 1/2013 | Hillier |
| 2013/0031191 | A1 | 1/2013 | Bott |
| 2013/0035136 | A1 | 2/2013 | Pison et al. |
| 2013/0054761 | A1 | 2/2013 | Kempf et al. |
| 2013/0064079 | A1 | 3/2013 | Zhang |
| 2013/0100819 | A1 | 4/2013 | Anchan et al. |
| 2013/0114615 | A1 | 5/2013 | Suemitsu |
| 2013/0132854 | A1 | 5/2013 | Raleigh et al. |
| 2013/0142073 | A1 | 6/2013 | Shikitani |
| 2013/0157673 | A1 | 6/2013 | Brusilovsky |
| 2013/0195457 | A1 | 8/2013 | Levy et al. |
| 2013/0227646 | A1 | 8/2013 | Haggerty et al. |
| 2013/0230047 | A1 | 9/2013 | Subrahmaniam |
| 2013/0345241 | A1 | 12/2013 | Nettekoven et al. |
| 2014/0004827 | A1 | 1/2014 | O'Leary |
| 2014/0024361 | A1 | 1/2014 | Poon et al. |
| 2014/0105119 | A1 | 4/2014 | Gupta |
| 2014/0140507 | A1 | 5/2014 | Park et al. |
| 2014/0169286 | A1 | 6/2014 | Xu |
| 2014/0199961 | A1 | 7/2014 | Mohammed et al. |
| 2014/0199962 | A1 | 7/2014 | Mohammed et al. |
| 2014/0226628 | A1 * | 8/2014 | Helbert ............... H04M 7/1225 370/331 |
| 2014/0233399 | A1 | 8/2014 | Mann |
| 2014/0235210 | A1 | 8/2014 | Park et al. |
| 2014/0259012 | A1 | 9/2014 | Nandlall et al. |
| 2014/0270764 | A1 | 9/2014 | DeCusatis et al. |
| 2014/0301203 | A1 | 10/2014 | Kampmann |
| 2014/0301397 | A1 | 10/2014 | Zhou |
| 2014/0329502 | A1 | 11/2014 | Lee et al. |
| 2014/0357219 | A1 | 12/2014 | Nicolaescu et al. |
| 2014/0380470 | A1 | 12/2014 | Taniuchi et al. |
| 2015/0032890 | A1 | 1/2015 | Bott |
| 2015/0065125 | A1 | 3/2015 | Patel et al. |
| 2015/0081421 | A1 | 3/2015 | Moseman et al. |
| 2015/0163731 | A1 | 6/2015 | Kotecha |
| 2015/0222554 | A1 | 8/2015 | Xu |
| 2015/0223104 | A1 | 8/2015 | Xu |
| 2015/0341791 | A1 | 11/2015 | Yang et al. |
| 2015/0349825 | A1 | 12/2015 | Lee et al. |
| 2015/0358757 | A1 | 12/2015 | Ford |
| 2015/0373530 | A1 | 12/2015 | Stein |
| 2016/0020802 | A1 | 1/2016 | Lee et al. |
| 2016/0021529 | A1 | 1/2016 | Park et al. |
| 2016/0050557 | A1 | 2/2016 | Park et al. |
| 2016/0080932 | A1 | 3/2016 | Jin et al. |
| 2016/0088456 | A1 | 3/2016 | Ramprasad et al. |
| 2016/0142855 | A1 * | 5/2016 | Yu ............... H04W 4/70 455/419 |
| 2016/0183095 | A1 | 6/2016 | Huber et al. |
| 2016/0192179 | A1 * | 6/2016 | Huber ............... H04W 8/20 455/411 |
| 2016/0198378 | A1 * | 7/2016 | Huber ............... H04W 8/265 370/331 |
| 2016/0242033 | A1 | 8/2016 | Jung et al. |
| 2016/0286377 | A1 | 9/2016 | Stein et al. |
| 2016/0295544 | A1 | 10/2016 | Jiang et al. |
| 2016/0316372 | A1 | 10/2016 | Daksiewicz et al. |
| 2016/0381699 | A1 | 12/2016 | Rubin et al. |
| 2017/0048713 | A1 | 2/2017 | Guday et al. |
| 2017/0070424 | A1 | 3/2017 | Xiao |
| 2017/0230820 | A1 | 8/2017 | Ho et al. |
| 2017/0289283 | A1 | 10/2017 | Ungerer et al. |
| 2017/0332421 | A1 | 11/2017 | Sternberg et al. |
| 2017/0374599 | A1 * | 12/2017 | Carvalho ............... H04W 8/205 |
| 2018/0077564 | A1 | 3/2018 | Xu et al. |
| 2018/0160385 | A1 | 6/2018 | Chastain et al. |
| 2018/0160387 | A1 | 6/2018 | Chastain et al. |
| 2018/0376325 | A1 | 12/2018 | Xu et al. |
| 2020/0068388 | A1 | 2/2020 | Xu et al. |

FOREIGN PATENT DOCUMENTS

| | | |
|---|---|---|
| WO | WO 2007/047479 | 4/2007 |
| WO | WO 2007/092573 | 8/2007 |
| WO | WO 2010/023645 | 3/2010 |
| WO | WO 2013/112642 | 8/2013 |
| WO | WO 2015/119965 | 8/2015 |
| WO | WO 2015/119967 | 8/2015 |
| WO | 2016/145121 A2 | 9/2016 |
| WO | WO 2019/005970 | 1/2019 |

OTHER PUBLICATIONS

"GSM Association, "Remote Provisioning Architecture for Embedded UICC Test Specification," Version 3.1, 524 pages (May 31, 2016)".

"GSM Association, "RSP Architecture," Version 2.1, 94 pages (Feb. 27, 2017)".

GSM Association, "RSP Technical Specification," Version 2.1, 247 pages (Feb. 27, 2017).

(56) References Cited

OTHER PUBLICATIONS

"GSM Association, "SGP.22 CR1003 RSP Technical Specification," Change Request Form, 221 pages (Jul. 8, 2016)".
"Hong Kong Mobility Partner Program, "Simgo Launches eSIM 4G Hotspot," [Online] [Retrieved on Sep. 16, 2016], Retrieved from the Internet URL: https://www.applemobility.hk/2016/02/25/simgo-launches-esim-4h-hotspot/, 3 pages (2016)".
"Meukel et al., "E-SIM for consumers—a game changer for mobile telecommunications?," McKinsey & Company, [Online], [Retrieved on Aug. 12, 2016], Retrieved from the Internet URL: https://www.mckinsey.com/industries/telecommunications/our-insights/ . . . , 12 pages (Jan. 2016)".
"MVNO Dynamics, "Globetouch and UROS Launch Global eSIM Ecosystem to Deliver Secure, Cost-Efficient Roaming," Press Release, [Online], [Retrieved on Sep. 16, 2016], Retrieved from the Internet URL: https://www.mynodynamics.com/2106/03/04/globeltouch-and-uros-launch . . . , 4 pages (Mar. 4, 2016)".
"Numerex Network Solutions, "Simplifying M2M Connectivity," 2 pages [Online] [Retrieved on Jan. 20, 2017]".
"Numerex, "5 Key Ingredients for a Robust, End-to-End IoT Platform," 8 pages [Online] [Retrieved on Jan. 20, 2017]".
"Applying Network Policy Control to Asymmetric Traffic: Considerations and Solutions," Sandvine Intelligent Broadband Networks, An Industry Whitepaper, Version 2.0, pp. 1-14 (2015).
"Inter-Service Provider IP Backbone Guidelines, PRD IR.34, Version 4.9," GSM Association, Official Document IR.34, pp. 1-48 (2010).
"Online Charging with Diameter Gy: Considerations for Accuracy and Reliability," Sandvine Intelligent Broadband Networks, An Industry Whitepaper, Version 2.0, pp. 1-10 (2015).
"OpenFlow Switch Specification, Version 1.3.0 (Wire Protocol 0x04)," The Open Networking Foundation, pp. 1-105 (2012).
Syniverse Hosted Roaming Policy Management, Syniverse Technologies, LLC., pp. 1-3 (2015).
"Syniverse Roaming Control Center," Syniverse Technologies, LLC., pp. 1-3 (2014).
"Syniverse Roaming Intelligence Suite," Syniverse Technologies, LLC., pp. 1-3 (2014).
"Syniverse User Experience Management," Syniverse Technologies, LLC., pp. 1-5 (2016).
Deutshe Telekom, "Global M2M Association eliminates borders," [Online], [Retrieved on Aug. 12, 2016], Retrieved from the Internet URL: https://www.telekom.com/media/enterprise-solutions/267180, 3 pages (Feb. 18, 2015).
GSM Association, "RSP Architecture," Version 2.0, 52 pages (Aug. 23, 2016).
LTE International Roaming Whitepaper, http://carrier.huawei.com/en/technical-topics/core-network/LTE-roaming-whitepaper, pp. 1-16 [retrieved on Apr. 22, 2016].
MacKee et al., "Navigating the eSIM revolution as an MNO, Embedded SIM—a game changer in mobile telcom," Oslo, 19 pages (Feb. 4, 2016).
Manulis, M., et al, "Authenticated Wireless Roaming via Tunnels: Making Mobile Guests Feel at Home," Proceedings of the ACM Symposium on Information, Computer and Communications Security (ASIACCS'09), pp. 1-22 (2009).
McKeown, N., et al., "OpenFlow: Enabling Innovation in Campus Networks," retrieved from archive.openflow.org/documents/openflow-wp-latest.pdf (2008).
Vahidian, "Evolution of the SIM to eSIM," NTNU-Trondheim, Norwegian University of Science and Technology, Department of Telematics, 110 pages (Jan. 21, 2013).
International Search Report for International Application No. PCT/US2018/024576, entitled "eSIM Profile Switching Without SMS," consisting of 3 pages, dated Jul. 2, 2018.
Rogers, Wireless: "Embedded UICC Remote Provisioning Discussion", Retrieved from the Internet: URL:http://www.3gpp.org/ftp/tsg_sa/WG3_Security/TSGS3_LI/2012_46_Quebec/ [retrieved on Mar. 22, 2013], vol. SA WG3, No. Quebec City, Canada (2013).
Arkessa, "Arkessa Demonstrate eSIM and eUICC profile switching in Germany," [Online]; [Retrieved on Feb. 10, 2020], Retrieved from the Internet URL: https://www.arkessa.com/news/arkessa-demo-esim-euicc-profile-switch/; 3 pages (Mar. 13, 2017).
GSM Association, "Remote Provisioning Architecture for Embedded UICC Technical Specification," Version 2.1, 297 pages (Nov. 1, 2015).

\* cited by examiner

ESIM PROFILE SWITCHING WITHOUT SMS

RELATED APPLICATION

This application is the U.S. National Stage of International Application No. PCT/US2018/024576, filed Mar. 27, 2018, which designates the U.S., published in English, and claims the benefit of U.S. Provisional Application No. 62/479,093 filed on Mar. 30, 2017. The entire teachings of the above applications are incorporated herein by reference.

BACKGROUND

Wireless communications systems such as the Long Term Evolution (LTE) mobile communications system, also referred to as Evolved Packet System (EPS) or 4th Generation (4G) system, the Global System for Mobile (GSM) communications, or the Wideband Code Division Multiple Access (W-CDMA) mobile communications system, typically enable roaming services. Network operators of such wireless communications systems offer roaming services to their subscribers, therefore allowing the subscribers to stay connected even as they travel across different regions or countries.

Mobile devices are configured to receive and operate removable Universal Integrated Circuit Cards (UICCs) that enable the mobile devices to access services provided by mobile network operators (MNOs). Each UICC typically includes at least a microprocessor and a read-only memory (ROM), where the ROM is configured to store one or more applets and authentication data that the mobile device uses to register and interact with the MNOs. Typically, a UICC takes the form of a small removable card, e.g., a subscriber identity module (SIM) card, which is configured to store a single MNO profile and be inserted into a UICC-receiving portion of the mobile device. More recently, UICCs are embedded directly into system boards of mobile devices and are configured to store multiple MNO profiles, referred to as embedded SIMs (eSIMs). For example, an embedded UICC (eUICC) can store one SIM profile for a local MNO and another SIM profile for an international MNO.

SUMMARY

The GSM Association (GSMA) has developed the "Remote Provisioning Architecture for Embedded UICC Technical Specification," Version 2.1 (Nov. 1, 2015) (referred to herein as "GSMA eSIM Specification") which describes an architecture for the remote provisioning and management of the eUICC in machine-to-machine (M2M) devices that are not easily reachable. The GSMA eSIM Specification resolves such limitation with remote SIM provisioning system to enable dynamically downloading a new SIM profile into an eSIM card, where it can switch to another MNO with the newly downloaded SIM profile, as if another new SIM card were plugged in.

A device may need to switch SIM profiles for a variety of reasons, such as switching to a local MNO for better data performance, or staying permanently in a country, where use of a local eSIM profile is mandatory per regulations. As M2M devices normally function by design without user interaction, replacing one SIM card with another local SIM card to change MNOs is no longer applicable. The GSMA eSIM Specification resolves such limitation with remote SIM provisioning system to dynamically download a new SIM profile into an eSIM card, where it can switch to another MNO with the newly downloaded SIM profile, as if another new SIM card were plugged in.

Such downloading of a SIM profile and switching to another MNO with the newly downloaded profile normally relies on sending messages via the short message service (SMS) protocol from a remote SIM provisioning platform (RSP) to the targeted eSIM card via its current SIM profile and current attached cellular network (e.g., GSM, 3G, or LTE network). Once receiving a command via the SMS from the RSP, the eSIM card can do a few actions per the GSMA eSIM Specification, such as downloading a new SIM profile, switching to another SIM profile, disabling/deleting one of the downloaded profiles, etc. Once the action is executed, the eSIM card through the device sends a confirmation to the RSP via SMS regarding the action taken. For example, after switching to another profile, and the device is attached to a new cellular network with the new profile, the eSIM normally sends a confirmation message via the SMS from the new network to the RSP where the status of the previous action is updated.

An issue arises when a SIM profile and/or the new mobile network does not provide SMS delivery capability. In the example above, without SMS, the confirmation message cannot be delivered to the RSP with the newly attached network. Therefore, the eSIM together with the RSP would consider the switching command has failed, and a fallback mechanism defined in the specification is triggered resulting in the eSIM falling back to the previous profile and network. This hinders the intent of using the new profile for a variety of reasons. Embodiments of the present disclosure are directed to addressing the above-referenced issues caused by a SIM profile and/or mobile network lacking SMS support.

In one aspect, a method and system provide for acquisition of eSIM device location information using a network approach, where the eSIM with the new profile attaches to a P-GW hosted by a third party. A data inspection module (e.g., a policy control device or a feature of the P-GW) accesses data transmitted between the eSIM and the P-GW to extract the eSIM device location information, such as MNC/MCC, IMSI, CellID, etc. The extracted location information is forwarded to an application server, where it can access the RSP for controlling the eSIM card.

According to at least one example embodiment, the present disclosure may be implemented in the form of a method or corresponding apparatus in which a device has an eSIM that includes a first profile and a second profile. The device may switch from attachment to a first network using the first profile to attachment to a second network using the second profile, the second network connecting to a third network over a data tunnel. In some embodiments, a data inspection module (e.g., a policy control device, a P-GW, or any other device known in the art to inspect data payloads) may be configured to extract information communicated over the data tunnel, the information being associated with the eSIM. In some embodiments, the data inspection module may send at least a portion of the extracted information to an application server.

According to some embodiments, the data tunnel may be a general packet radio service (GPRS) tunneling protocol (GTP) tunnel. In some embodiments, the extracted information may include location information associated with the eSIM. Further, the location information may include a mobile country code (MCC) in combination with a mobile network code (MNC) (a combination known as an "MCC/MNC tuple") to uniquely identify a mobile network operator (MNO) using the GSM (including GSM-R), UMTS, and/or LTE public land mobile networks. Further still, the location information may also include International Mobile Subscriber Identity (IMSI) or CellID to identify the subscriber of the mobile device and/or the MNO.

According to some embodiments, the data inspection module may send at least a portion of the extracted information to serve as a notification to the application server that the eSIM has switched to the second profile. In some embodiments, the second network lacks short message service capability.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
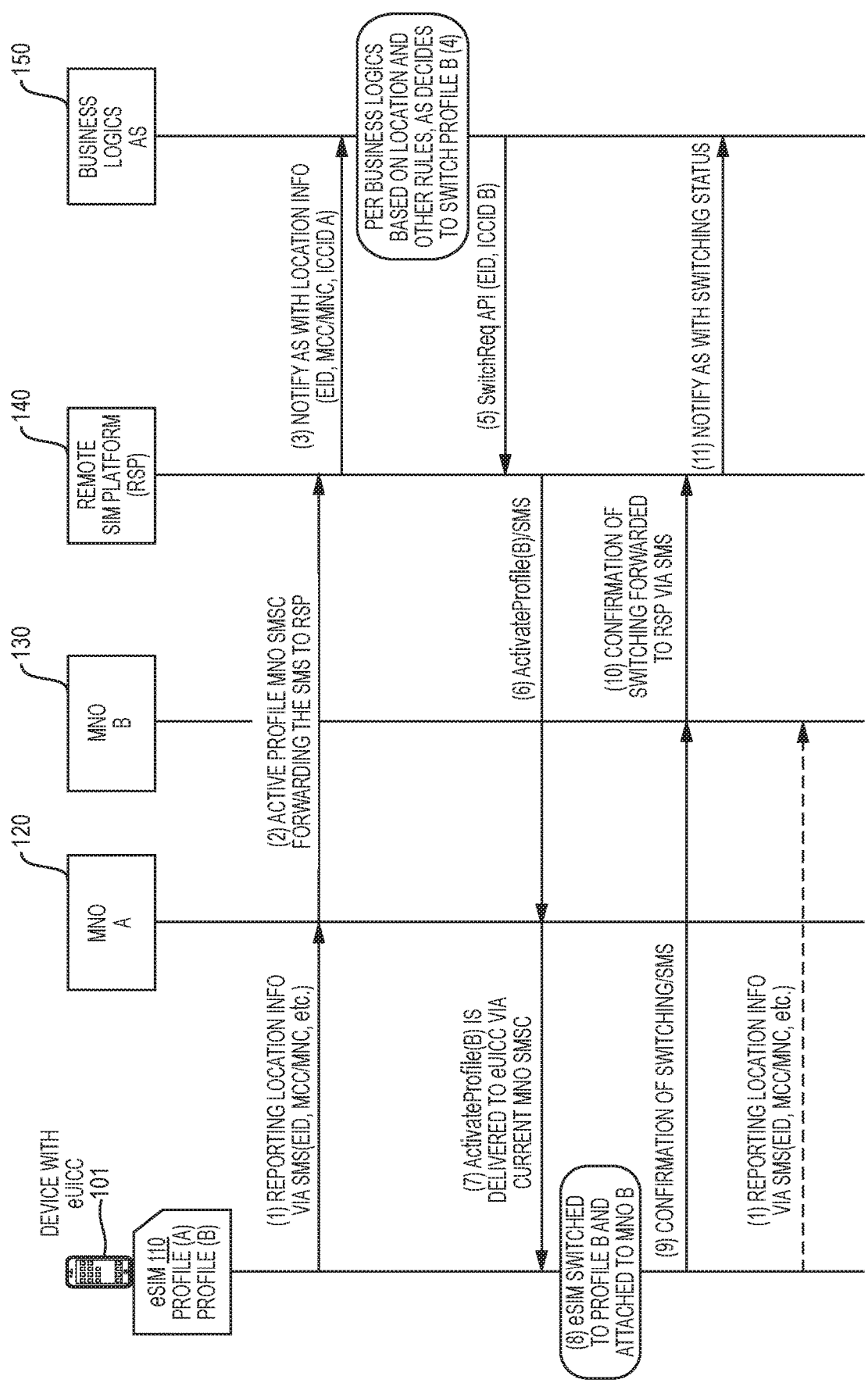
FIG. 1 is a signaling flow chart illustrating a typical profile switching flow between two networks based on utilizing SMS protocol in both networks.

FIG. 1 is a signaling flow chart that illustrates a typical profile switching flow between two networks based on utilizing SMS protocol in both networks. In particular, the configuration includes a mobile device 101 with eSIM 110 having two previously downloaded profiles (Profile A, Profile B), two networks (MNO A 120, MNO B 130), a remote SIM provisioning platform (RSP) 140 and a business logic application server (AS) 150. Typically, an applet (e.g., status update applet) within the eSIM card 110 sends network location information associated with the mobile device 101, and other device related information, via an SMS message through the MNO A 120 to the RSP 140 (steps 1, 2) where it can be passed to the external AS 150 (step 3) for a variety of needs per business logic. The AS 150 can request the RSP 140 to take one or more actions toward the eSIM 110 via application program interfaces (APIs) or system integration with RSP 140 (steps 5, 6, 7).

For example, the AS 150 can issue a "switching to Profile B" command to instruct the eSIM 110 to switch to Profile B and access the MNO B 130 cellular network based on business logic (e.g., Profile B in the location has better network performance or is cost-effective). For example, the AS 150 may be configured with the switching logic described in application Ser. No. 15/634,692, filed Jun. 27, 2017, entitled "Internet of Things Architecture," the contents of which are incorporated herein in their entirety.

As shown in FIG. 1, and in accordance with the GSMA eSIM specification, the eSIM 110 takes a series of steps to attach to the MNO B network 130 with the Profile B (normally belonging to MNO B 130). Once attached, the eSIM 110 will send a confirmation message via SMS channel to the RSP 140, where the switching command is considered as completed and similar confirmation is also sent to the AS 150 which initiated the request (steps 8, 9, 10, 11). The SMS channel from both MNO A 120 and MNO B 130 are needed to assist the handshaking between the eSIM 110 and the RSP 140 to synchronize actions initiated by the RSP 140.

Figure 2:
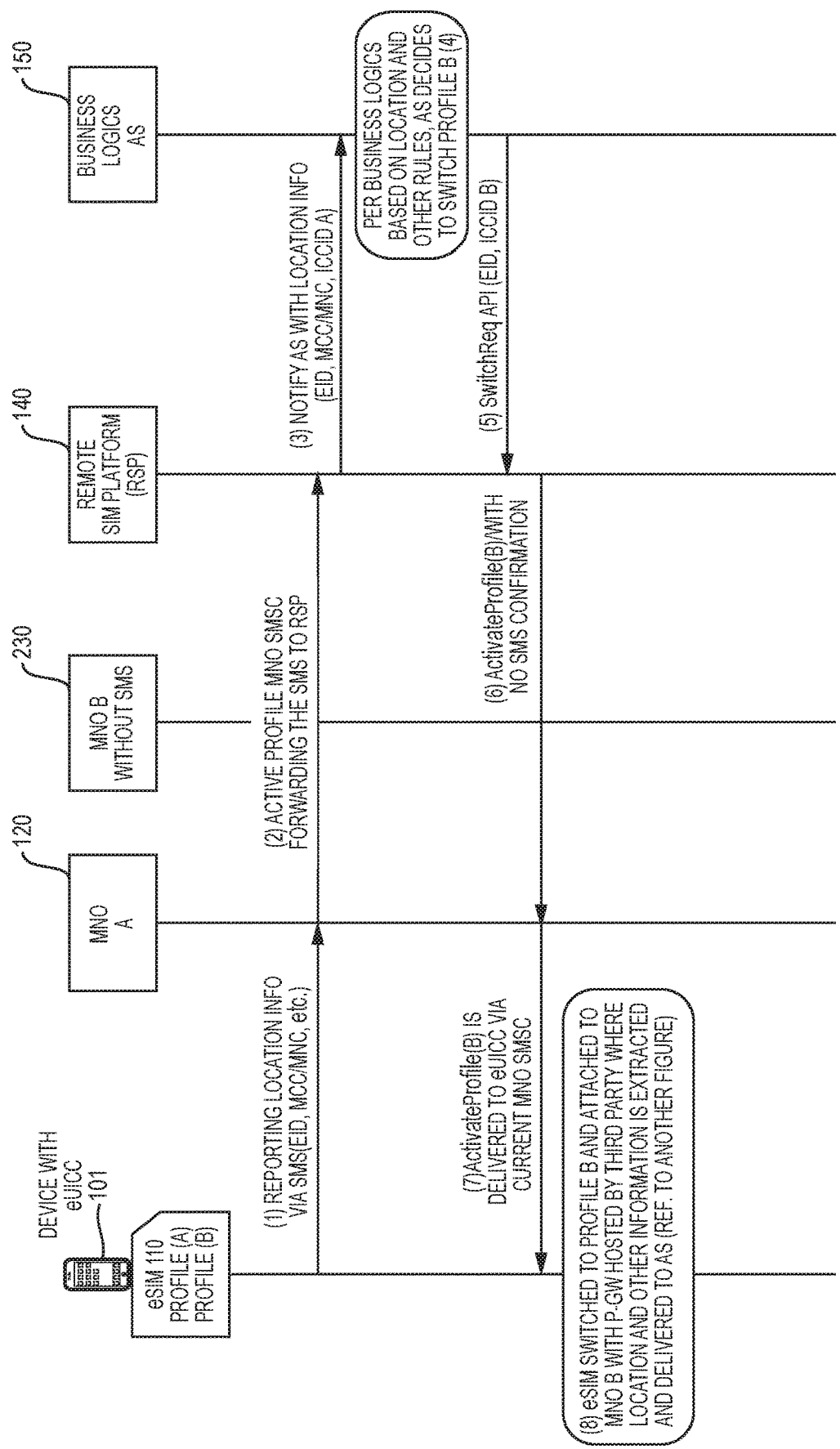
FIG. 2 is a signaling flow chart illustrating profile switching flow between two networks wherein the second network is without SMS support.

FIG. 2 is a signaling flow chart illustrating profile switching flow between two networks wherein the second network is without SMS channel support. In this embodiment, the RSP 140 does not expect direct confirmation from the eSIM 110 when it instructs the eSIM 110 to switch to Profile B resulting in the mobile device 101 detaching from MNO A 120 and attaching to MNO B 230 (which does not support SMS). The switching command issued from the RSP 140 to the eSIM 110 contains the information to inform the eSIM 110 to simply switch without sending any status back (steps 6, 7). Therefore, once the eSIM has switched to Profile B, the mobile device 101 will stay on the MNO B network 230 without sending any SMS messaging. In some embodiments, the MNO B network 230 may only support data access and does not have SMS capabilities. In some embodiments, Profile B does not support SMS messaging.

Figure 3:
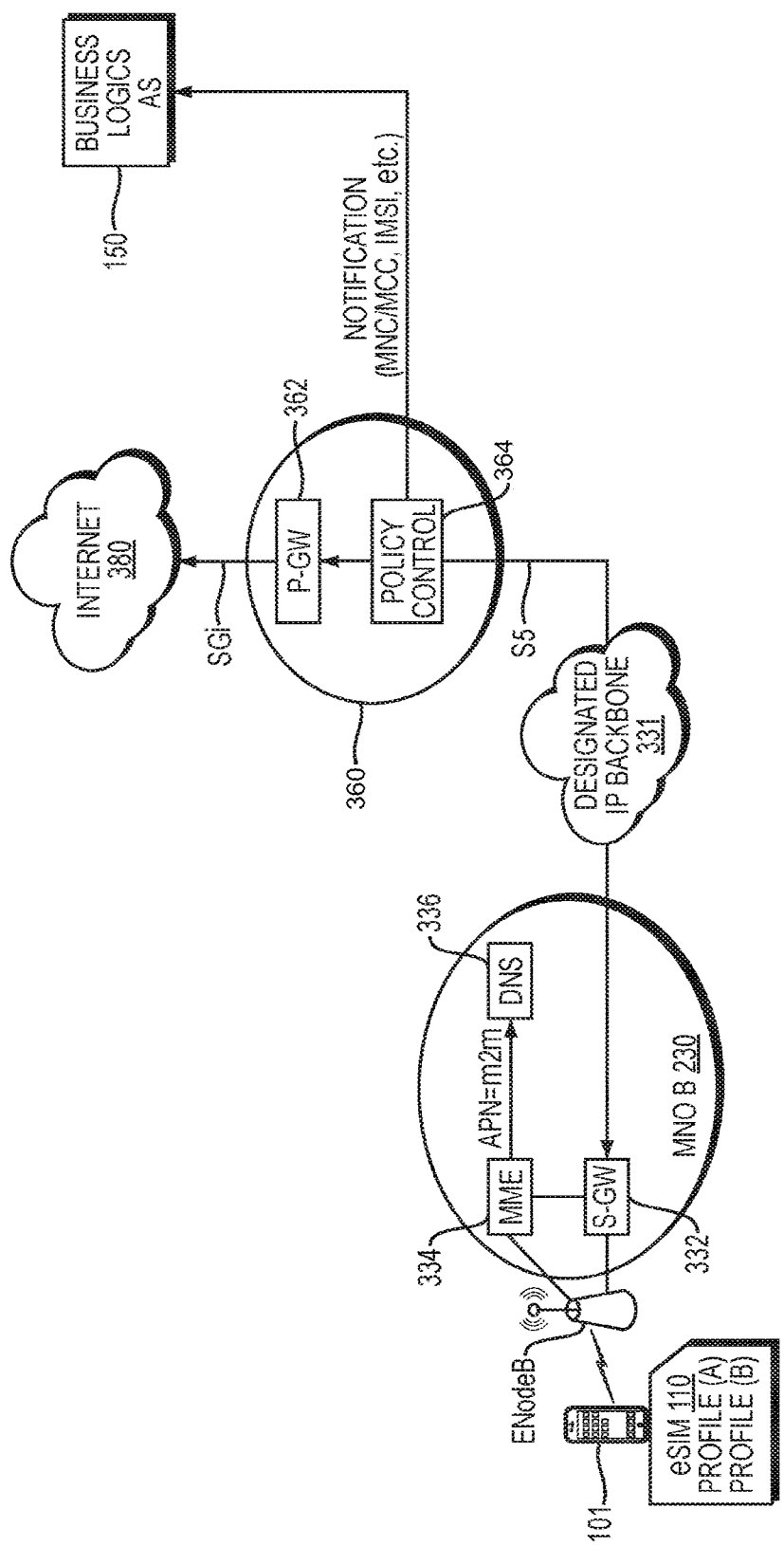
FIG. 3 is a block diagram illustrating a network topology for collecting location information after the eSIM is attached to the second network without SMS support, according to at least one example embodiment.

FIG. 3 is a block diagram illustrating a network topology for collecting location information after the mobile device 101 with the eSIM 110 is attached to the second network (MNO B 230) without SMS support of FIG. 2, according to at least one example embodiment. In this embodiment, Profile B defines a special access point name (APN), such as "m2m", with the Profile B owner operator (e.g., MNO B). When the mobile device 101 with eSIM 110 using Profile B is attached to MNO B 230, the MME 334 queries the local DNS 336 for a given APN (e.g., APN="m2m") assigned to a third party and indicating a third party network 360. The local DNS 336 resolves the APN with one or more P-GW(s) 362 IP addresses hosted by the third party network 360. In some embodiments, the third party network 360 may be an interconnect network and/or a "hub-breakout" network as described in U.S. Pat. No. 9,788,188, entitled "Method and System for Hub Breakout Roaming," the contents of which are incorporated herein in their entirety. However, the third party network 360 is not limited to any specific type of network.

The MNO B network 230 may be connected to the third party network 360 via a designated IP backbone connection 331. In some embodiments, the designated IP backbone connection 331 may be a secure private connection (e.g. a virtual private network (VPN) connection) that hosts the GTP tunnel between the S-GW 332 and P-GW 362.

Figure 4:
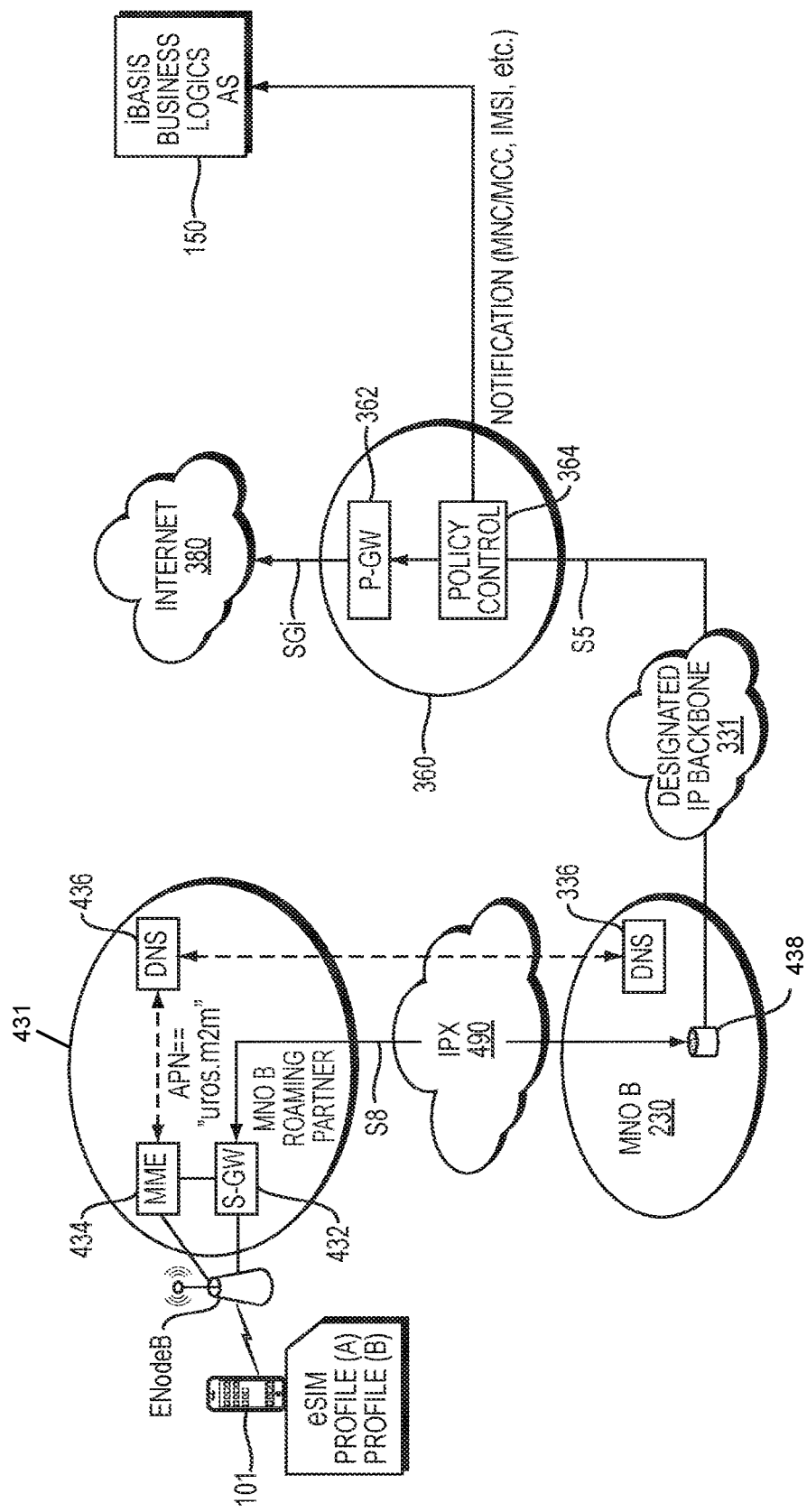
FIG. 4 is a block diagram illustrating a network topology for collecting location information after the eSIM is attached to the second network without SMS support through roaming access, according to at least one example embodiment.

The P-GW 362 is provided to terminate a GTP tunnel for the mobile device 101 using the designated APN assigned for this purpose. In some embodiments, the P-GW 362 is responsible for assigning an IP address to access an external network 380 (e.g., the Internet). The third party network 360 may include a real-time policy control device 364 deployed between the MNO B's S-GW 332 and the P-GW 362. The policy control device 364 is configured to inspect each GTP payload between the S-GW 332 and P-GW 362, and extract location information of the targeted mobile device 101 with eSIM 110 using Profile B directly accessing from MNO B 230 or its roaming partner network 231 as indicated in FIG. 4. The acquired location information is passed to the AS 150 to serve as notification of the mobile device's 101 location information, which would be missed otherwise if the AS 150 were to rely on a SMS message as in the configuration of FIG. 1.

An example policy control device is disclosed in application Ser. No. 15/260,897, filed Sep. 9, 2016, entitled "Policy Control Framework," the contents of which are incorporated herein in their entirety. However, for purposes of this disclosure the policy control device need only to have the capability to inspect data (i.e., each GTP payload or data packet) that passes between the S-GW 332 and P-GW 362 and extract information for the AS 150. Alternatively, the embodiments of the P-GW 362 may inspect the data and extract information without the need for a separate policy control device or data inspection module.

According to some embodiments, when the mobile device 101 disconnects with the MNO B network 230, the eSIM 110 may change its profile to a default profile, for example, Profile A. Alternatively, the eSIM 110 may change to another profile associated with another mobile operator's network. When the eSIM 110 switches to Profile A and attaches to MNO A 120, the applet with in the eSIM card 110 sends network location information associated with the mobile device 101, and other device related information, via an SMS message through the MNO A 120 to the RSP 140 where it can be passed to the AS 150. This is shown as steps 1-3 in the signaling flow chart of FIG. 1. Thus, the AS 150 is notified that the mobile device 101 has disconnected from MNO B 230 and has connected to MNO A 120 which supports SMS messages.

FIG. 4 is a block diagram illustrating a network topology for collecting location information after the mobile device 101 with eSIM 110 is connected to the second network (MNO B 230) without SMS support through roaming access. This example embodiment operates similar to the example embodiment of FIG. 3. However, in this example embodiment, the mobile device 101 with eSIM 110 using Profile B is attached to MNO B's roaming partner network 431.

In some embodiments, MNO B's roaming partner network 431 may be connected to MNO B 230 through an interconnect network 490 (e.g., an Internetwork Packet eXchange (IPX)). In some embodiments, Profile B defines a special access point name (APN), such as "m2m", with the Profile B owner operator (e.g., MNO B). When the mobile device 101 with eSIM 110 using Profile B is attached to MNO B's roaming partner network 431, the MME 434 queries the local DNS 436 for a given APN (e.g., APN="m2m") assigned to a third party and indicating the third party network 360. The local DNS 436 on MNO B's roaming partner network 431 resolves the APN through the DNS 336 on MNO B 230 with one or more P-GW(s) 362 IP addresses hosted by the third party network 360.

According to some embodiments, MNO B's roaming partner network 431 may be connected to MNO B 230 through any type of roaming connection known in the art. According to the example embodiment of FIG. 4, the S-GW 432 of MNO B's roaming partner network 431 forms a GTP tunnel to a router 438 in MNO B 230. The router 438 may route the data connection to the P-GW 362 where the GTP tunnel is terminated. As stated in reference to FIG. 3, The MNO B network 230 may be connected to the third party network 360 via a designated IP backbone connection 331.

The designated IP backbone connection 331 may be a secure private connection (e.g. a virtual private network (VPN) connection) that hosts the GTP tunnel between the router 230 and P-GW 362.

Again, as stated in reference to FIG. 3, the P-GW 362 is provided to terminate a GTP tunnel for the mobile device 101 using the designated APN assigned for this purpose. In some embodiments, the P-GW 362 is responsible for assigning an IP address to access an external network 380 (e.g., the Internet). The third party network 360 may include a real-time policy control device 364 deployed between the MNO B's S-GW 332 and the P-GW 362. The policy control device 364 is configured to inspect each GTP payload between the S-GW 332 and P-GW 362, and extract location information of the targeted mobile device 101 with eSIM 110 using profile B directly accessing from MNO B 230 or its roaming partner network 231 as indicated in FIG. 4. The acquired location information is passed to the AS 150 to serve as notification of the mobile device's 101 location information, which would be missed otherwise if the AS 150 were to rely on a SMS message as in the configuration of FIG. 1.

Figure 5:
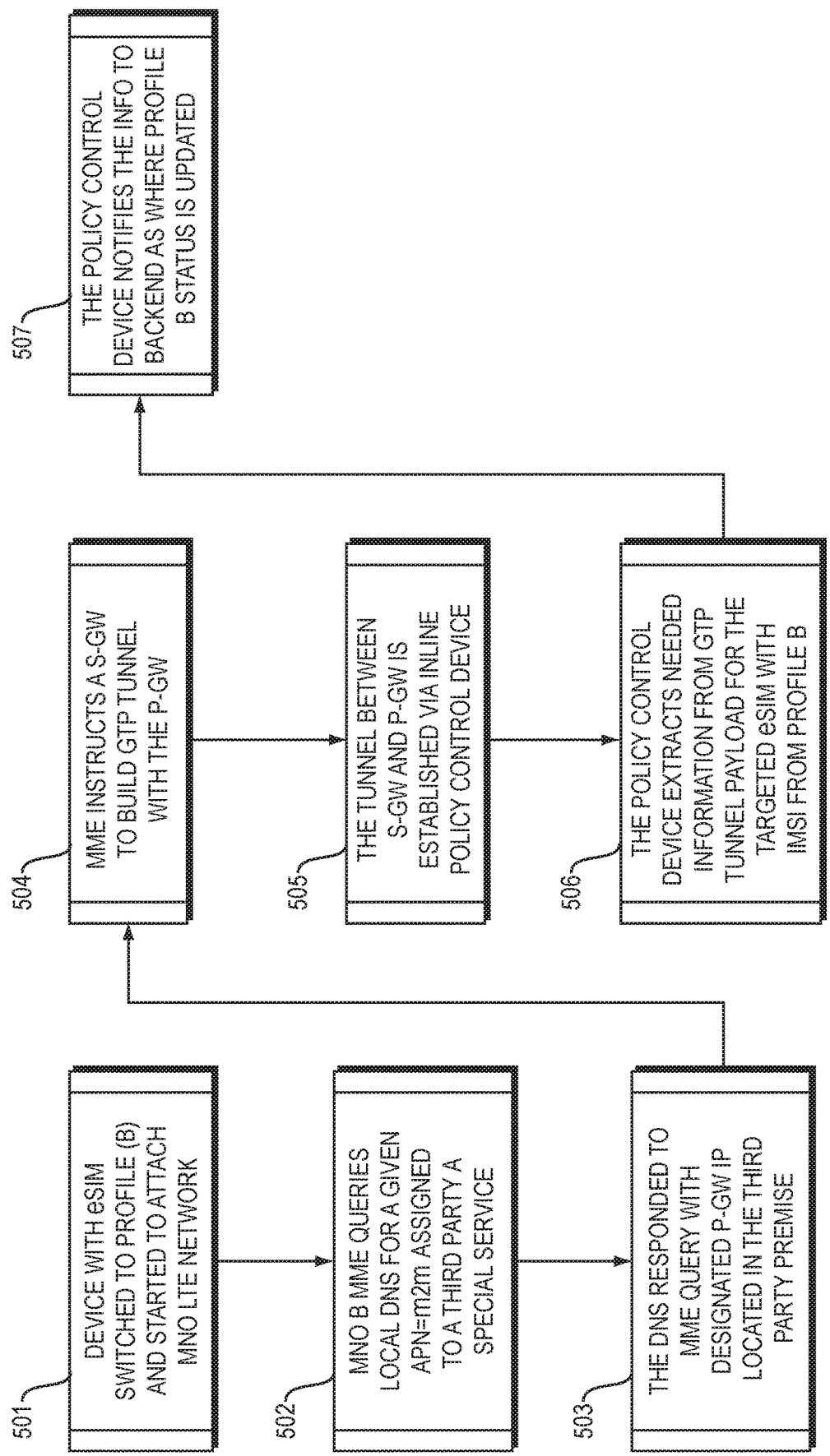
FIG. 5 is a flow chart illustrating steps to extract location information associated with an eSIM device attached to the second network without SMS support, according to at least one example embodiment.

FIG. 5 is a block diagram illustrating steps to extract location information associated with the mobile device 101 with eSIM 110 attached to the second network (MNO B 230) without SMS support, according to at least one example embodiment. In particular, the logic steps are shown for the configuration when the eSIM 110 uses Profile B to access MNO B 230 or roaming partner networks (e.g., MNO B roaming partner network 431). The first five steps (501-505) are standard procedures required by an LTE network.

According the to the example embodiment in FIG. 5, the mobile device 101 with eSIM 110 switches to profile B and attaches to the MNO B network 230 (501). The MME 334 of MNO B 230 queries local DNS 336 for a given APN (e.g., APN="m2m") assigned to a third party and indicating the third parties network 360 (502). The local DNS 336 responds to the MME 334 query with a designated P-GW 362 IP (503). In some embodiments, the P-GW 362 is located on the third party network 360. The MME 334 instructs a S-GW 332 to establish a GTP tunnel 331 with the P-GW 362 (504). According to some embodiments, the GTP tunnel 331 includes an inline policy control device 364 capable of inspecting each packet of data communicated between the S-GW 332 and the P-GW 362 (505).

According to some embodiments, the policy control device 364 extracts location information from the GTP tunnel 331 across MNO B 230 and the third party P-GW 362 (506). The policy control device 364 communicates the extracted information to the AS 150 (507). The AS 150 receives the extracted information and updates the status of the eSIM 110 as utilizing profile B and being attached to MNO B 230. This ensures the business logic can be seamlessly executed with the needed location information without concern as to whether or not the eSIM profile or MNO B 230 supports SMS messaging.

Figure 6:
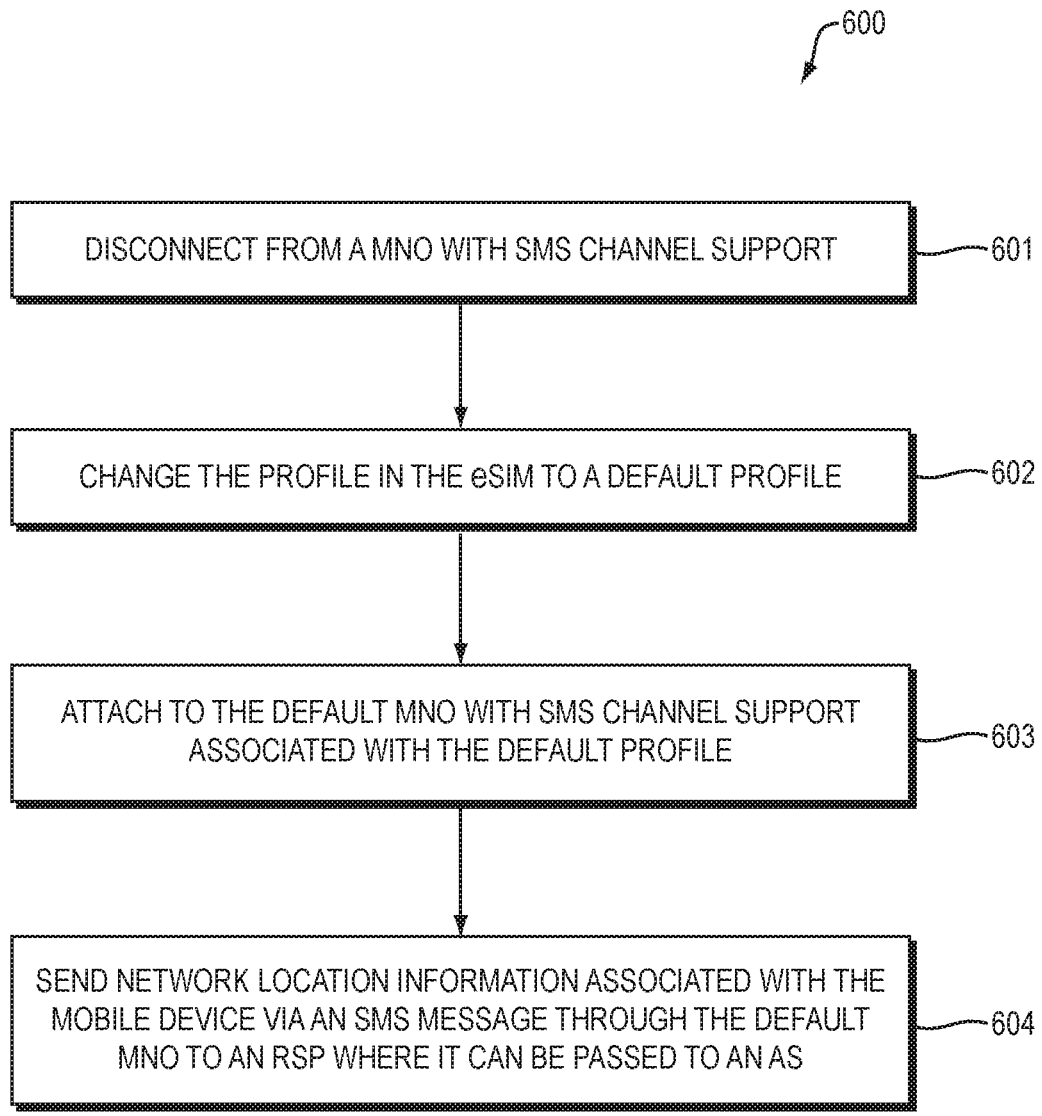
FIG. 6 is a flow chart illustrating an example method for a mobile device with a eSIM to disconnect from a mobile network without SMS channel support.

FIG. 6 is a flow chart illustrating an example method for a mobile device with a eSIM to disconnect from a mobile network without SMS channel support. According to the example method 600, a mobile device with an eSIM disconnects from a MNO without SMS channel support 601. The mobile device may disconnect for a variety of reasons, including but not limited to, leaving the MNO geographic location, the MNO forcing a disconnect, internal logic in the eSIM switching the profile to cause the mobile device to connect to a different or default network, or any other reason for disconnecting as known in the art.

Prior to disconnecting from the MNO or after losing connection to the MNO, the eSIM 110 may change its profile to a default profile 602. Alternatively, the eSIM may change to any other profile associated with another mobile operator's network. In some embodiments, the eSIM switches to the default profile 602 and attaches to a MNO associated with the default profile (i.e., a default MNO) 603. An applet with in the eSIM card may send network location information associated with the mobile device, and other device related information, via an SMS message through the default MNO (with SMS channel support) to an RSP where it can be passed to an AS 604. Thus, the AS is notified that the mobile device has disconnected from the previous MNO without SMS channel support and has connected to the default MNO which supports SMS.

It should be understood that, while the example embodiments described herein refer to configurations with a policy control device within a third party network, other embodiments may have a policy control device located elsewhere including the MNO. As long as the policy control device is positioned to inspect data as it passes to an external network, such as the Internet 380 (as shown in FIG. 3 and FIG. 4).

Additionally, it should be understood that, while the example embodiments described herein refer to configurations with a policy control device, other embodiments may utilize a data inspection module or the P-GW itself to inspect the data and extract information. While the policy control device may be configured with policy control features, those features are not necessary for all embodiments. For purposes of this disclosure, the term "data inspection module" is inclusive of policy control devices that are capable of inspecting data and extracting information therefrom. Further, the term "data inspection module" would include any device capable of inspecting data and extracting information therefrom as described in reference to the embodiments presented above.

Further, it should be understood that, while the example embodiments described herein refer to configurations in which the eSIM has two profiles, other embodiments may have configurations in which the eSIM has more than two profiles. The principles disclosed herein regarding switching profiles with SMS support can be applied to configurations in which the eSIM has more than two profiles.

It should be understood that the example embodiments described above may be implemented in many different ways. In some instances, the various methods and machines described herein may each be implemented by a physical, virtual or hybrid general purpose computer having a central processor, memory, disk or other mass storage, communication interface(s), input/output (I/O) device(s), and other peripherals. The general purpose computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., which enables the transfer of information between the elements. One or more central processor units are attached to the system bus and provide for the execution of computer instructions. Also attached to system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a non-transitory computer-readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. In a system in which a device has an embedded subscriber identity module (eSIM) that includes a first profile and a second profile, the device switching from attachment to a first network using the first profile to attachment to a second network using the second profile, the second network connecting to an external network over a data tunnel, a method comprising:

extracting, at a data inspection module, information communicated over the data tunnel, the second network further connecting to a third network over the data tunnel, the information associated with the eSIM and communicated over the data tunnel between the second network and the third network, the data inspection module positioned to inspect data as it passes to the external network; and sending, from the data inspection module to an application server, at least a portion of the extracted information as a notification to the application server that the eSIM has switched to the second profile, wherein the second network lacks short message service (SMS) capability for delivering an SMS message as the notification.

2. The method of claim 1, wherein the data inspection module is located in the third network.

3. The method of claim 1, wherein the external network is the Internet.

4. The method of claim 1, wherein the data tunnel is a general packet radio service (GPRS) tunneling protocol (GTP) tunnel.

5. The method of claim 1, wherein the extracted information includes location information associated with the eSIM.

6. The method of claim 5, wherein the location information includes a mobile country code (MCC) in combination with a mobile network code (MNC) (MCC/MNC), International Mobile Subscriber Identity (IMSI), or cell identifier (CellID).

7. A data inspection module configured to:
extract information communicated over a data tunnel, the information associated with an embedded subscriber identity module (eSIM) having a first profile for attaching to a first network and a second profile for attaching to a second network, the second network connected to a third-network over the data tunnel, the information communicated over the data tunnel between the second network and the third network, the second network further connected to an external network via the data tunnel and the third network, the data inspection module positioned to inspect data as it passes to the external network; and
send at least a portion of the extracted information to an application server as a notification to the application server that the eSIM has switched to the second profile, wherein the second network lacks short message service (SMS) capability for delivering an SMS message as the notification.

8. The data inspection module of claim 7, wherein the data inspection module is located in the third network.

9. The data inspection module of claim 7, wherein the data tunnel is a general packet radio service (GPRS) tunneling protocol (GTP) tunnel.

10. The data inspection module of claim 7, wherein the extracted information includes location information associated with the eSIM.

11. The data inspection module of claim 10, wherein the location information includes a mobile country code (MCC) in combination with a mobile network code (MNC) (MCC/MNC), International Mobile Subscriber Identity (IMSI), or cell identifier (CellID).

12. The data inspection module of claim 7, wherein the external network is the Internet.

* * * * *